Oct. 4, 1949.  W. W. LYSAK  2,483,916
METHOD OF AND ATTACHMENT FOR DOPED FABRIC
Filed May 23, 1945  2 Sheets-Sheet 1
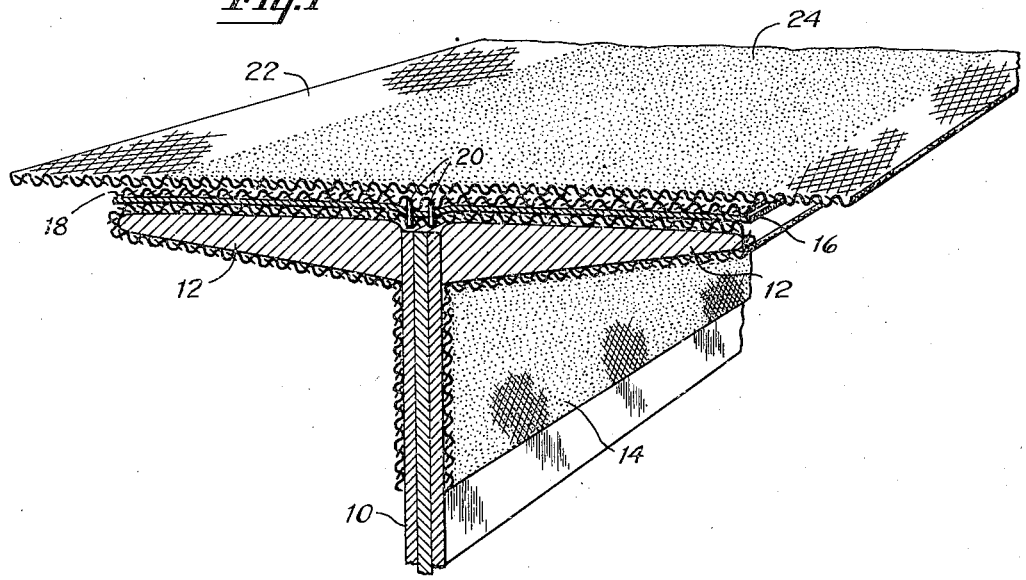
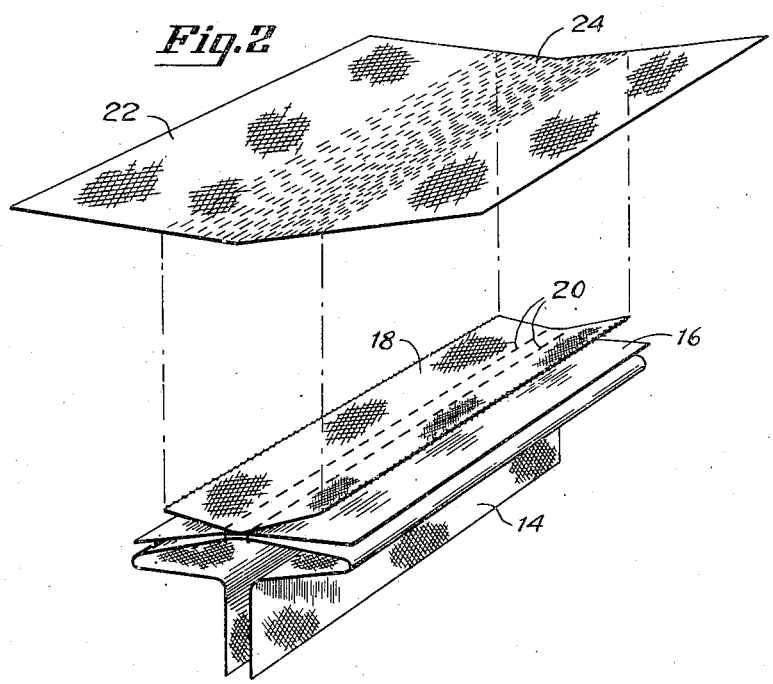
INVENTOR
Walter W. Lysak
AGENT

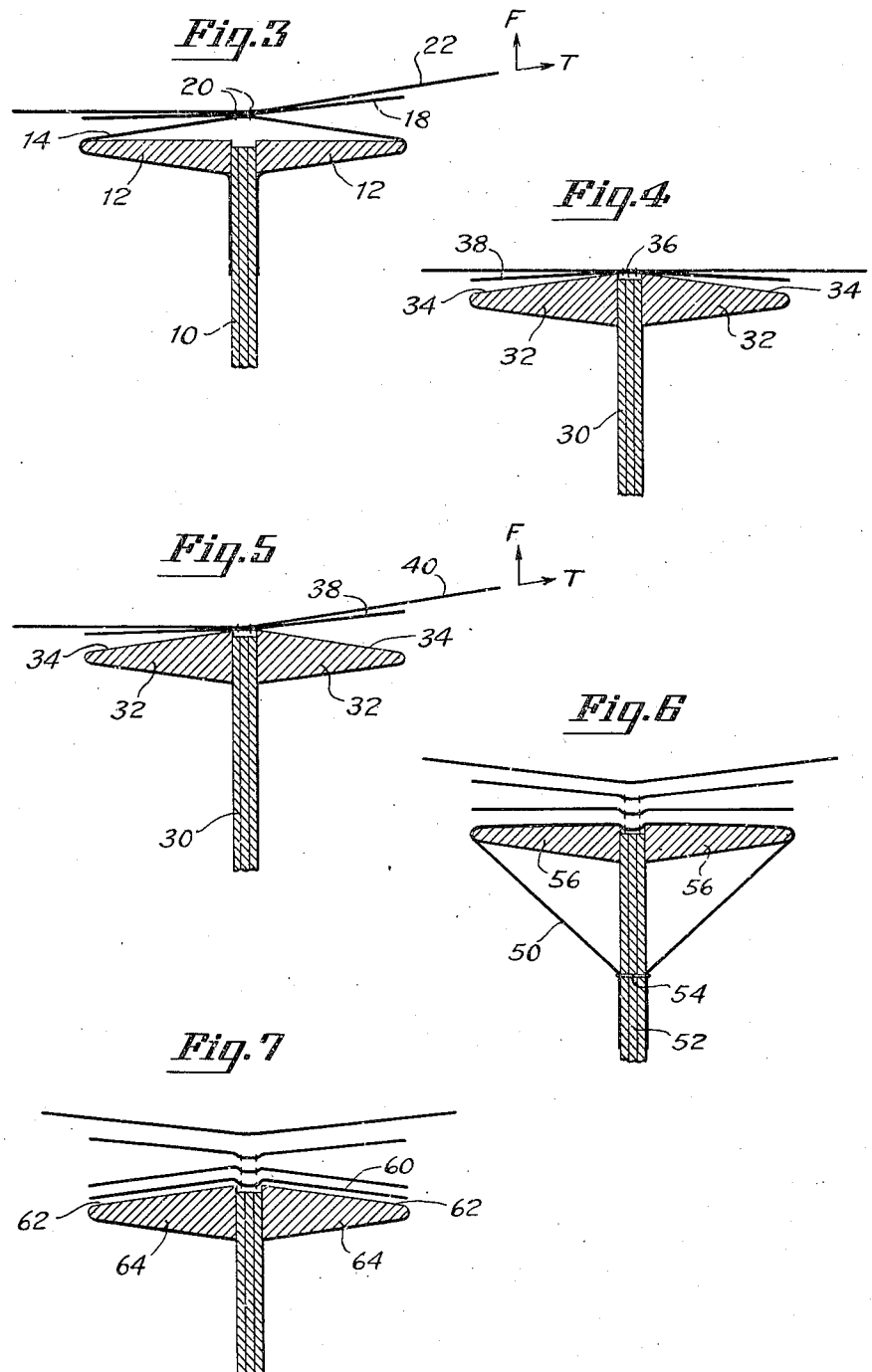

Patented Oct. 4, 1949

2,483,916

UNITED STATES PATENT OFFICE 2,483,916

METHOD OF AND ATTACHMENT FOR DOPED FABRIC

Walter W. Lysak, Seymour, Conn., assignor to United Aircraft Corporation, East Hartford, Conn., a corporation of Delaware Application May 23, 1945, Serial No. 595,437

13 Claims. (Cl. 244—132)

This invention relates generally to means and method for providing an improved cover for sections of aircraft. More particularly, this invention provides improved means for covering an aircraft and freeing the outside cover from irregular surfaces which increase the drag of the aircraft, and eliminating the need for tedious steps in the fabrication of airfoil sections, for example.

In the past, it has been common practice to place the outside cover upon an airfoil section and sew through the structural parts of the section and thereafter place a substance known as "dope" on the fabric to shrink the same and glue the parts together. All surfaces through which lacings and stitches passed had tape doped on over them in an attempt to streamline the same to reduce the air friction of the surface. Such operations failed to provide completely smooth surfaces for the outer cover of the aircraft section, and further called for many precise operations in assembling the cover with respect to the balance of the section.

An object of the present invention is to provide an improved structure including a smooth cover for aircraft.

A further object is to provide an improved means and method for covering airfoil sections that eliminates stitching completely through structural parts when the cover is in place.

A further object is to provide means for covering an airfoil section which will enable partial assembly to be made by the fabricators before the device is finally assembled.

Another object in keeping with the above objects is to provide an improved airfoil section wherein the tension of the cover under aerodynamic conditions is taken in shear by doped-together surfaces and tension in the threads assembling different parts.

A further object, in keeping with the above objects, is to provide improved covering means and method wherein the structural parts of the aircraft section are strengthened by the parts making up means for securing the cover in place.

A further object, in keeping with the above objects, is to provide improved means and method for covering airfoil sections in which different structural parts may be braced to different degrees by portions of the means forming the cover securement means.

The foregoing and other objects will be either obvious or pointed out in the following specification and claims.

In the drawings:

Fig. 1 is a perspective view with parts in section of an assembled part of an aircraft rib and cover with the present means for securing the cover to the rib shown.

Fig. 2 is an exploded view of parts of the cover securing means shown with the rib removed.

Fig. 3 is a diagrammatic sectional view, similar to Fig. 1, but showing the action of the securing means under aerodynamic conditions.

Fig. 4 is a diagrammatic view of a modified form of my invention.

Fig. 5 is a view of that modification shown in Fig. 4 but with the securing means shown in the position it will assume under aerodynamic conditions.

Fig. 6 is an exploded diagrammatic view of a modification of the present invention showing a portion of the securing means arranged for bracing the flange of the rib section.

Fig. 7 is a diagrammatic view of another modification of the present invention.

In the following description, some specific embodiments of the present invention will be given, and some specific steps in the fabrication of the device will be explained. It will be understood, however, that those examples are only illustrative of presently preferred forms of construction and that many other constructions can be made in keeping with the teachings in the instant disclosure in view of the current knowledge of those skilled in the art. For that reason, I wish not to be limited only to those forms shown and described but by the scope of the invention as defined in the claims set out below.

In Fig. 1, an airfoil section is shown as made up of a structural member, herein a rib comprising a web 10 having flanges 12 extending laterally of the web. The web 10 is shown as made up of laminated construction such as plywood. The flanges 12 are shown as being of solid wood and may also be of plywood if desired. However, for the purpose of practicing the present invention, it is not necessary that the parts 10 and 12 be made of wood, but could be made of metal, plastic or other suitable substance. The flanges 12 as shown in Fig. 1 will serve to increase the strength of the web 10. When the bottom part of the airfoil section is the same as the top, the entire section might take the form of an "I" beam, for example. However, other sectional shapes may be used without departing from the spirit of the invention.

A foundation strip 14 is cemented or sewed to the web 10. The strip 14 extends around the members 12 and closely fits the web 10 and the flanges 12. A strip of metal foil 16 lies over the upper surface of the strip 14. A suitable chemical substance such as wax, for example, could take the place of the metal strip 16. The strip 16 is provided in the position shown to prevent dope applied above the strip from seeping through and fastening parts, to be later described, to the upper flat surface of the strip 14 adjacent the upper surfaces of the flanges 12. A fastening strip 18 lies over the strip 16 and may have substantially the same area as the area of the upper surfaces of flanges 12. The fastening strip 18 is sewed to the foundation strip 14 by stitches 20. A cover 22 for the entire portion of the aircraft to be assembled lies in engagement with the fastening strip 18. In the position thus assembled, dope 24 is applied to the surface of the cover fabric 22, which dope in the liquid state, will permeate the fabric 22 and when dried bond the same to the fastening strip 18. The metal strip 16 will prevent the dope from seeping through to wet the upper surface of the foundation strip 14. Thus, in the finally assembled condition, the cover fabric 22 is connected to the foundation strip 14 through the fastening strip 18 and is free to move about the threads 20 and is not fastened down with respect to the outer edges of the flanges 12.

In Fig. 2, the structure disclosed above is shown in an exploded arrangement with the web 10 and flanges 12 removed. The fabric 22 is shown as extending outwardly and upwardly from its center portion where it is doped. Such a condition results when aerodynamic forces act upon the part of the craft so covered. The method of fastening the strip 18 by stitches 20 through the impermeable strip 16 and the foundation strip 14 is clearly shown in this figure.

In Fig. 3, that form of the invention shown in Fig. 1 is shown in a position that it will take under the action of aerodynamic forces tending to lift the cover 22. At such time, the fastening strip 18 will rise with the cover 22 because it is bonded thereto by the dope, or the like. The stitches 20 thus transfer the tension created by the forces lifting the cover 22 in a straight line to the foundation strip 14 which can move up and away from the upper surface of the flange 12. Thus, the tension upon the cover 22, produced by the forces lifting the same, is taken in shear by the dope between the fastening strip 18 and the cover 22, and between threads 20, and is transferred in a straight line to the foundation strip 14 which bears upon the left hand side of flange 12 in the case shown in Fig. 3. It will be understood that as the left hand side of cover 22 is lifted due to aerodynamic action, the opposite condition will obtain and the right hand flange 12 will assume the forces. Inasmuch as the two flanges 12 are assembled with the web 10 to form a portion of an "I" section, for example, there will be an increased resistance to bending in a transverse direction inasmuch as the strip 14 for fastening the cover 22 to the rib of the section will also strengthen the rib.

In many places the weight can be reduced substantially from the weight of prior art structure while retaining full strength for the parts.

In assembling that form of the invention shown in Figs. 1, 2 and 3, the foundation strip 14, the impermeable strip or wax coat or the like 16 may be applied to the central portion of the foundation strip 14, the fastening strip 18 can be laid over the portion 16, and the entire structure can be stitched together by the stitches 20 upon a machine, thus eliminating a great number of hitherto performed manual operations. The assembled structure can then be applied to the web 10 and the flanges 12, the lower portions of the foundation strip 14 wrapped around and sewed or cemented to the web 10 and the under surfaces of the flanges 12. Such operations facilitate mass production and eliminate the need for highly skilled help in finally assembling the cover 22 to the rib section.

The subassembled part described above can be placed upon wing beams, spars, ribs and other structural parts of the wing as well as upon the fuselage framing members and upon control surface parts. Many of these subassembled parts may then be made relatively small and easy to handle and the separate parts of the air frame can have securing means such as described above placed upon them before these parts are finally assembled together to complete the air frame. After the air frame is assembled with the fastening parts in place, the cover 22 for the wing, or fuselage, or the like can be slipped over the part and doped, in place. This method of construction will facilitate rapid production and obviously eliminate a large number of hereto performed steps in assembling the covers of aircraft parts by the stitching methods or the methods of glueing down the cover upon structural parts. Inasmuch as the instant structure gives flexibility through the securing strips 18 and the cover 22 through the stitches 20, the cover 22 will not have a tendency to peel off of the part to which it is doped, which is a distinct advantage over directly doped on covers, for example.

The structure described above also adds to the strength and toughness of an assembled part. The foundation strip 14, in combination with the flanges 12, secured to web portions, provides structural parts in the final assembled state that exert additional resistance to transverse bending, and even when bent have a toughness which prevents fracture of the structural part because the foundation web 14 will assume tensile stresses that otherwise would have to be taken in toto by the flanges 12 or the web 10 of the aircraft section.

In Figs. 4 and 5, a modified construction is shown, in the static state, in Fig. 4, and under aerodynamic action in Fig. 5. A web 30 has flanges 32 around which a foundation strip may be wrapped and glued and/or sewn in place. The flanges 32 have upper surfaces 34 which slope down from the center portion of the entire structure which provides a groove 36 in which the stitches for the securing strip 38 may lie. As best shown in Fig. 5, when the fabric 40 is moved upwardly by aerodynamic forces, the tension in the strip may be taken in alignment with the sloped surfaces 34 of a flange 32 and the foundation strip will not be urged away from the surface 34.

In Fig. 6, a further modified structure is shown wherein the foundation strip 50 is secured to the web 52 by stitches 54 as well as by dope. The foundation strip 50 overlies and is arranged at an angle with flanges 56 to brace the same for rotation around the web 52 to thus strengthen the structure and avoid the need for heavy parts making up the flanges 56 and the web 52 for resisting torsional moments exerted by the cover fabric.

In Fig. 7, a further modified structure is shown wherein a foundation strip 60 is secured to upper surfaces 62 of flanges 64. The foundation strip 60 does not extend around the flanges and is doped in place upon the surfaces 62. Such structure does not have the strength of those forms of my invention described above but is lighter in construction and suitable for applying to surfaces which do not require such great strength nor absorb large forces. The balance of the construction for securing the cover in place is the same as described in connection with the other modifications, and will resist peeling off by taking stresses in shear.

While I have shown and described several forms that my invention may take, and have explained the method for securing a cover to an air frame part in an improved manner for providing a smooth exterior surface and for strengthening the part covered, it will be understood that still other forms and modifications and modified steps in the method will occur to those skilled in the art. For these reasons, I wish not to be limited in my invention only to those forms and methods shown and described but by the scope of the following claims.

I claim:

1. In aircraft, in combination, a structural part, a foundation strip secured to said part, a fastening strip secured by stitches to said foundation strip and having flaps at opposite sides of the stitches, impermeable means between said foundation strip and said flaps, a smooth cover fabric lying upon said fastening strip, and means bonding said fabric to said flaps.

2. In aircraft, in combination, a structural part, having a grooved surface, a foundation strip secured to said part, a fastening strip secured by stitches to said foundation strip and having flaps at opposite sides of the stitches, said stitches lying in the groove in said surface, impermeable means between said foundation strip and said flaps, a smooth cover fabric lying upon said fastening strip, and means bonding said fabric to said flaps.

3. In aircraft, means for securing a cover fabric to a structural member comprising, in combination, a flanged portion on said structural member having a longitudinally extending groove therein, a foundation strip overlying said flange and secured to said member, a fastening strip sewed to said foundation strip with the stitches lying in said groove, impermeable means between said fastening strip and said foundation strip, a cover fabric lying upon said fastening strip, and a bonding agent securing said fabric to said fastening strip.

4. In aircraft, means for securing a cover fabric to a structural member comprising, in combination, a portion on said structural member having a longitudinally extending groove therein, a foundation strip adjacent said portion and secured to said member, a metal foil strip, a fastening strip sewed through said metal foil strip to said foundation strip with the stitches lying in said groove, a cover fabric lying upon said fastening strip, and a bonding agent securing said fabric to said fastening strip.

5. In aircraft, means for securing a cover fabric to a structural member comprising, in combination, a portion on said structural member having a longitudinally extending groove therein, a foundation strip adjacent said portion and secured to said member, an impermeable strip, a fastening strip sewed through said impermeable strip to said foundation strip with the stitches lying in said groove, a cover fabric lying upon said fastening strip, and a bonding agent securing said fabric to said fastening strip.

6. In aircraft, means for securing a cover fabric to a structural member comprising, in combination, a flanged portion on said structural member having a longitudinally extending groove therein, a foundation strip overlying said flange and secured to said member, portions of said strip being arranged at an angle to the edges of said flanged portion and secured to said member to strengthen the structure, a fastening strip sewed to said foundation strip with the stitches lying in said groove, impermeable means between said fastening strip and said foundation strip, a cover fabric lying upon said fastening strip, and a bonding agent securing said fabric to said fastening strip.

7. In aircraft, means for securing cover fabric to a foundation member, comprising in combination, a fastening strip, means securing said fastening strip to said foundation member to provide a substantially smooth surface for said fastening strip, impermeable means between said fastening strip and said member, a cover upon said fastening strip, and a bonding agent securing said cover fabric to said fastening strip.

8. In aircraft, means for securing cover fabric to a foundation member having a flange, comprising in combination, a fastening strip, means securing said fastening strip to said flange to provide a substantially smooth surface for said fastening strip, portions of said strip being arranged to strengthen said member, impermeable means between said fastening strip and said member, a cover upon said fastening strip, and a bonding agent securing said cover fabric to said fastening strip.

9. In aircraft, in combination, a structural part, a foundation strip secured to said part, a fastening strip secured by stitches to said foundation strip and having flaps at opposite sides of the stitches, a smooth cover fabric lying upon said fastening strip, and means bonding said fabric to said flaps.

10. In aircraft, means for securing a cover fabric to a structural member having a longitudinally extending groove therein, a foundation strip secured to said member and overlying said groove, a fastening strip sewed to said foundation strip along said groove with the stitches lying in said groove, a cover fabric overlying said fastening strip and said stitches, and means for adhesively securing said fabric to said fastening strip.

11. In aircraft, in combination, a structural part, a foundation strip secured to said part, a fastening strip secured to said foundation strip and having flaps extending transversely of the foundation member, a smooth cover fabric overlying said fastening strip and said stitches, and means for adhesively securing said fabric to said flaps.

12. The method of securing a cover fabric to an underlying structural member which comprises the steps of securing a fabric foundation strip to the structural member, placing a fastening strip of permeable material over said foundation strip with a strip of fluid impermeable material therebetween, securing said strips together in the aforesaid relation by stitching, placing the cover fabric over said fastening strip, and adhesively bonding said cover fabric to said fastening strip by impregnating said cover fabric and said fastening strip in the vicinity of said stitching with an adhesive.

13. The method of securing a cover fabric to an underlying structural member comprising the steps of securing a fabric foundation strip to the structural member, stitching a fastening strip of permeable material to said foundation strip adjacent a point in the latter that is capable of resisting shear forces, placing a fluid impermeable material adjacent said stitching and between said fastening and foundation strips, placing said cover fabric upon said fastening strip, and applying an adhesive adjacent said stitching that will permeate both said cover fabric and said fastening strip to thereby secure the two in such manner that shear forces applied to said cover fabric are taken in shear by the adhesive.

WALTER W. LYSAK.

REFERENCES CITED

The following references are of record in the file of this patent:

UNITED STATES PATENTS

| Number | Name | Date |
|---|---|---|
| 1,331,150 | Hooper | Feb. 17, 1920 |
| 1,611,031 | Henderson | Dec. 14, 1926 |
| 1,887,691 | Loetscher | Nov. 15, 1932 |
| 1,901,864 | Bellanca | Mar. 21, 1933 |
| 2,045,317 | Sobie | June 23, 1936 |
| 2,053,048 | Robinson | Sept. 1, 1936 |
| 2,166,182 | Schmidt | July 18, 1939 |
| 2,291,935 | Woodall et al. | Aug. 4, 1942 |
| 2,349,103 | Marschner et al. | May 16, 1944 |

FOREIGN PATENTS

| Number | Country | Date |
|---|---|---|
| 438,327 | Great Britain | Nov. 14, 1935 |
| 28,701 | Great Britain | 1913 |